(12) United States Patent
Minamisawa

(10) Patent No.: US 6,198,644 B1
(45) Date of Patent: Mar. 6, 2001

(54) RECTIFYING/SMOOTHING CIRCUIT AND DOUBLE-ENDED CONVERTER

(75) Inventor: Toshitaka Minamisawa, Nagano (JP)

(73) Assignee: Nagano Japan Radio Co., Ltd., Nagano (JP)

( * ) Notice: Subject to any disclaimer, the term of this patent is extended or adjusted under 35 U.S.C. 154(b) by 0 days.

(21) Appl. No.: 09/508,099

(22) PCT Filed: Aug. 26, 1999

(86) PCT No.: PCT/JP99/04597

§ 371 Date: May 16, 2000

§ 102(e) Date: May 16, 2000

(87) PCT Pub. No.: WO00/14861

PCT Pub. Date: Mar. 16, 2000

(30) Foreign Application Priority Data

Sep. 3, 1998 (JP) .................................................. 10-249387

(51) Int. Cl.$^7$ ............................. H02M 1/14; H02M 3/335
(52) U.S. Cl. ................................. 363/44; 363/17; 363/126
(58) Field of Search ................................. 363/17, 22, 23, 363/24, 25, 26, 44, 45, 47, 125, 126

(56) References Cited

U.S. PATENT DOCUMENTS 5,450,307 * 9/1995 Yasumura .............................. 363/47
6,064,580 * 5/2000 Watanabe et al. ...................... 363/17

FOREIGN PATENT DOCUMENTS

| 3-241801 | 10/1991 | (JP) . |
| 4-355906 | 12/1992 | (JP) . |
| 6-166562 | 6/1994 | (JP) . |
| 7-236270 | 9/1995 | (JP) . |
| 9-84338 | 3/1997 | (JP) . |

OTHER PUBLICATIONS

English Language Abstract og JP 9–84338,Mar. 28, 1997.
English Language Abstract of JP 7–236270, Sep. 5, 1995.
English Language Abstract of JP 6–166562, Jun. 14, 1994.
English Language Abstract of JP 4–355906, Dec. 9, 1992.
English Language Abstract of JP 3–241801, Oct. 29, 1991.

* cited by examiner

Primary Examiner—Jessica Han
(74) Attorney, Agent, or Firm—Greenblum & Bernstein, P.L.C.

(57) ABSTRACT

A rectifying and smoothing circuit (3) which includes a first inductor connected between one end (2b1) of an output winding of a transformer (2) and a low potential-side output portion (16b), a second inductor connected between the other end (2b2) of the output winding and the low potential-side output portion, a first rectifying element (11) connected between the one end of the output winding and a high potential-side output portion (16a), and a second rectifying element (12) connected between the other end of the output winding and the high potential-side output portion, and which generates a DC voltage (V0) by rectifying and smoothing a bipolar voltage (VS) induced across the output winding, has a construction permitting reduction of the size and manufacturing costs thereof and enhancement of smoothing effects. In this rectifying and smoothing circuit, the first and second inductors are constructed by a first winding (17a) and a second winding (17) of a transformer, which are wound in a manner permitting magnetic fluxes generated by respective currents flowing therethrough to cancel each other.

14 Claims, 10 Drawing Sheets

RECTIFYING/SMOOTHING CIRCUIT AND DOUBLE-ENDED CONVERTER

TECHNICAL FIELD

This invention relates to a rectifying and smoothing circuit based on a current doubler rectification method, and a double-ended (bipolar) converter using the rectifying and smoothing circuit, such as a push-pull converter, a half-bridge converter, an asymmetric half-bridge converter, a full-bridge converter, and an active clamp converter.

BACKGROUND ART

Conventionally, as a power supply including a rectifying and smoothing circuit based on the current doubler rectification method of the above-mentioned kind, a power supply 81 shown in FIG. 17 is known. This power supply 81 includes a switching transformer 2, and a current doubler rectifying and smoothing circuit 82. In this case, the current doubler rectifying and smoothing circuit 82 is comprised of a smoothing choke coil 14 connected between one end 2b1 of a secondary winding 2b of the transformer 2 and an output terminal 16b on a low-potential side, a smoothing choke coil 15 connected between the other end 2b2 of the secondary winding 2b and an output terminal 16b on a high-potential side and having the same inductance value as that of the choke coil 14, a diode 11 as a rectifying element, connected between the one end 2b1 of the secondary winding 2b and an output terminal 16a, and a diode 12 as a rectifying element, connected between the other end 2b2 of the secondary winding 2b and the output terminal 16a. The current doubler rectifying and smoothing circuit 82 outputs a DC voltage V0 generated by rectifying and smoothing a bipolar voltage induced between the opposite ends of the secondary winding 2b to a load 4.

In this power supply 81, push-pull FET circuits, not shown, connected to one end 2a1 of a primary winding 2a of the transformer 2 and the other end 2a2 thereof, respectively, are driven at 180 degrees out of phase with respect to each other, whereby as shown in FIG. 18, a bipolar voltage VS having a voltage value±VS is induced between the opposite ends of the secondary winding 2b of the transformer 2. In this case, in a period T1 during which one of the FET circuits is controlled to an ON state at a duty ratio D of 25%, a high voltage is induced on the side of the one end 2b1 of the secondary winding 2b during the ON time period TON of the FET, and this induced voltage causes a current I31 shown in FIG. 17 to flow through a current path of the one end 2b1 of the secondary winding 2b, the diode 11, the load 4, the choke coil 15, and the other end 2b2 of the secondary winding 2b. In this state, as shown in FIG. 18, a voltage VL15 having a voltage value $(VS-V0=(1-D)/D \cdot V0/f$, where f represents a frequency of the bipolar voltage VS) and directed as shown in FIG. 17 is generated between opposite ends of the choke coil 15, whereby energy is accumulated in the choke coil 15.

Further, during an OFF time period TOFF of the period T1, the energy accumulated in the choke coil 15 causes a current I32 to flow in a direction shown in the same figure through a current path of one end of the choke coil 15, the diode 12, the load 4, and the other end of the choke coil 15. Consequently, the voltage VL15 between the opposite ends of the choke coil 15 is caused to have a voltage (–V0), and at the same time, as shown in FIG. 18, a current IL15 varying within a range of a current variation width $((VS-V0) \cdot TON/Lo=(1-D) \cdot V0/f$, where Lo represents an inductance value of the choke coils 14 and 15) flows through the choke coil 15.

Further, in the period T2 (the same time period as the period T1) during which the other FET is controlled to an ON state at a duty ratio D of 25%, a high voltage is induced on the side of the other end 2b2 of the secondary winding 2b during the ON time period TON of the FET, and this induced voltage causes a current I33 shown in FIG. 17 to flow through a current path of the other end 2b2 of the secondary winding 2b, the diode 12, the load 4, the choke coil 14, and the one end 2b1 of the secondary winding 2b. In this state, as shown in FIG. 18, between the opposite ends of the choke coil 14 is generated a voltage VL14 having a voltage value (VS–V0) and directed as shown in FIG. 17, whereby energy is accumulated in the choke coil 14.

Further, during an OFF time period TOFF of the period T2, the energy accumulated in the choke coil 14 causes a current I34 to flow in a direction shown in FIG. 17 through a current path of one end of the choke coil 14, the diode 11, the load 4, and the other end of the choke coil 14. Consequently, the voltage VL14 between the opposite ends of the choke coil 14 become equal to a voltage value (–V0), and as shown in FIG. 18, a current IL14 varying within a range of a current variation width $((VS-V0) \cdot TON/Lo=(1-D) \cdot V0/f)$ flows through the choke coil 14. In the above process of operation, each of average current values of the currents IL15 and IL14 becomes equal to one half of an output current I0, since a sum total of the current values of the currents becomes equal to the output current I0, shown in FIGS. 17 and 18, and at the same time the current values thereof are equal to each other. It should be noted that as shown in FIGS. 17 and 18, a ripple current IC flowing through the capacitor 13 varies within a range of a current variation width $((1-2D) \cdot V0/f=(1-TON/(T-TON)) \cdot (VS-V0) \cdot TON/Lo$, where D represents a duty ratio, and f represents the reciprocal of the period T).

As described above, smoothing operations are carried out by the choke coils 14 and 15 during a time period of each of the periods T1 and T2, so that as shown in FIG. 18, an output current Io from which a ripple component is substantially eliminated is output to the load 4.

DISCLOSURE OF THE INVENTION

The inventor studies the above prior art and found out the following problems:

Firstly, the conventional current doubler rectifying and smoothing circuit 82 uses the choke coils 14 and 15 constructed as separate component parts independent of each other. Therefore, the current doubler rectifying and smoothing circuit 82 has a large number of component parts and suffers from the problem of increased manufacturing costs caused by the mounting of component parts.

Secondly, a DC current having a predetermined current value constantly flows through the choke coils 14 and 15, as shown in FIG. 18, respectively. In this case, as shown by the characteristics of the DC current with respect to the excitation inductance (LX) in FIG. 16, there is a predetermined relationship between the excitation inductance (LX) of smoothing coils (choke coils 14 and 15 in the above current doubler rectifying and smoothing circuit 82) and a DC current allowed to pass through the smoothing coils. That is, to enhance the effect of the smoothing coils as smoothing filters, it is preferred that the smoothing coils have a large excitation inductance, whereas the value of a saturation DC current is reduced as the excitation inductance is increased. More specifically, when the effective volume of a smoothing choke coil as a magnetic material is small, if the excitation inductance is set to a small value (L2), as shown by a characteristic CH1, the smoothing choke coil can be used without magnetic saturation thereof until a current having a rather large current value (I22) flows therethrough, whereas if the excitation inductance is set to a large value (L1), there is a fear that the magnetic material undergoes magnetic saturation, since the limit value of a current below which the smoothing coil can be used without magnetic saturation thereof is lowered to a very small value (I21). Further, as shown by a characteristic CH2, when the effective volume of the coil as a magnetic material is made sufficiently large, if the excitation inductance is set to a small value (L2), the smoothing choke coil can be used without magnetic saturation thereof, until a current having a rather large current value (I24) flows therethrough, and furthermore, even if the excitation inductance is set to a rather large value (L1), the smoothing choke coil can be used without magnetic saturation thereof, until the current flowing reaches a larger current value (I23) than in the case of the characteristic CH1. In such a case, however, a large mounting space is required.

For the above reason, the conventional current doubler rectifying and smoothing circuit 82 can suffer from magnetic saturation of the choke coils 14 and 15. In such a case, the choke coils 14 and 15 and the push-pull FET circuits on the primary side can be broken or the choke coils 14 and 15 cease to function as smoothing filters. On the other hand, to cause the choke coils 14 and 15 to fully perform the function as smoothing filters without causing magnetic saturation thereof, it is required that the effective volumes of the coils as magnetic materials are made sufficiently large. This results in an increase in the size of the current doubler rectifying and smoothing circuit 82, and further in an increase in the size of the power supply 81.

The present invention has been made to solve the above problems, and it is a main object of the invention to provide a rectifying and smoothing circuit which can be reduced in size, and at the same time permit reduction of manufacturing costs through decreasing the number of component parts thereof and enhance a smoothing effect thereof, as well as a double-ended converter using the rectifying and smoothing circuit.

The rectifying and smoothing circuit according to this invention includes a first inductor connected between one end of an output winding of a first switching transformer and a low potential-side output portion, a second inductor connected between another end of the output winding and the low potential-side output portion, a first rectifying element connected between the one end of the output winding and a high potential-side output portion, and a second rectifying element connected between the another end of the output winding and the high potential-side output portion, the rectifying and smoothing circuit generating a DC voltage by rectifying and smoothing a bipolar voltage induced across the output winding, and is characterized in that the first inductor and the second inductor are constructed by a first winding and a second winding of a second transformer, respectively, the first winding and the second winding being wound in a manner permitting magnetic fluxes generated by respective currents flowing therethrough to cancel each other.

In this rectifying and smoothing circuit, the first winding and the second winding of the second transformer serve as smoothing coils. Therefore, during the smoothing operation, magnetic fluxes generated from the windings by respective currents flowing therethrough cancel each other, so that a DC component of the exciting current flowing through the second transformer becomes approximately equal to 0 A. Consequently, magnetic saturation in the second transformer caused by a DC bias can be prevented. This makes it possible to construct smoothing coils having a large excitation inductance by using ferrite cores having small effective volumes, and hence the current doubler rectifying and smoothing circuit can be caused to serve as more excellent smoothing filters. Further, since the two choke coils 14 and 15 of the conventional current doubler rectifying and smoothing circuit 82 are replaced by one second transformer, the rectifying and smoothing circuit and further the power supply using this rectifying and smoothing circuit can be made smaller in size.

In this case, the first inductance and the second inductor are each constructed by a series circuit of an equivalent leakage inductance of the second transformer and an equivalent excitation inductance thereof.

Further, it is preferred that the second transformer is constructed by the first winding and the second winding wound in a manner spaced from each other by a predetermined distance. This construction of the second transformer permits the leakage inductance of the second transformer to be defined to be equal to a desired value according to the separation distance. Consequently, the effects of the second transformer as smoothing filters can be determined as desired depending on an object or use of the transformer. Further, the second transformer may be formed with a bypass passage for a magnetic flux. In this case as well, it is possible to define the leakage inductance of the second transformer to be equal to a desired value according to an amount of amagnetic flux passing through the bypass passage. Further, the second transformer may use magnetic cores having a low magnetic permeability. In this case as well, the leakage inductance of the second transformer can be defined to be equal to a desired value according to the degree of the magnetic permeability.

On the other hand, the second transformer can be constructed by winding the first winding and the second winding around magnetic cores formed with gaps. In this rectifying and smoothing circuit, the excitation inductance of the second transformer can be defined to be equal to a desired value according to the widths of the gaps, so that the effects of the second transformer as smoothing filters can be determined as desired depending on an object or use of the transformer.

Further, a third inductor may be connected in series with at least one of the first winding and the second winding of the second transformer. In this rectifying and smoothing circuit, if the inductance value of the third inductor is properly defined, the leakage inductance of the second transformer can be adjusted to a desired value with ease.

Additionally, it is preferred that a double-ended converter is constructed by incorporating the above rectifying and smoothing circuit. This construction of the double-ended converter realizes a power supply having more excellent smoothing filters and moreover is reduced in manufacturing costs and size thereof by reduction of the number of component parts of the rectifying and smoothing circuit.

BRIEF DESCRIPTION OF DRAWINGS

FIG. 12 is a diagram showing current waveforms of switching signals SS3 and SS4 input to the power supply 41 or the like;

BEST MODE OF CARRYING OUT THE INVENTION

A rectifying and smoothing circuit and a double-ended converter according to preferred embodiments of the invention will be described below with reference to accompanying drawings.

(First Embodiment)

Figure 2:
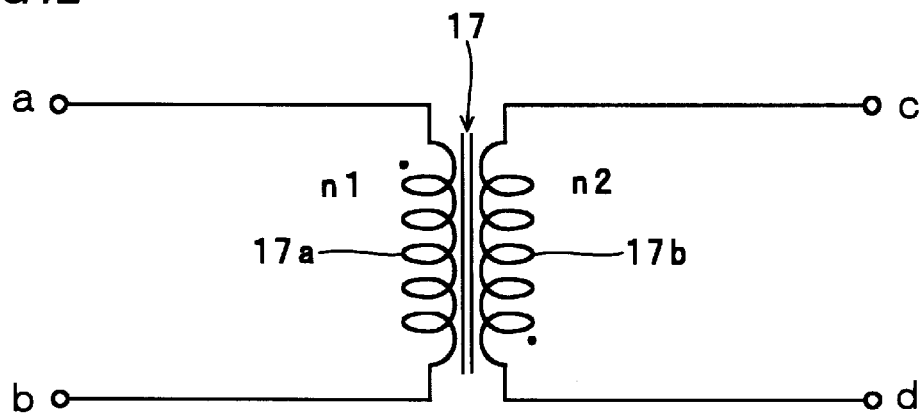
FIG. 2 is a circuit diagram of a transformer 17 in the power supply 1 according to the first embodiment.
Figure 3:
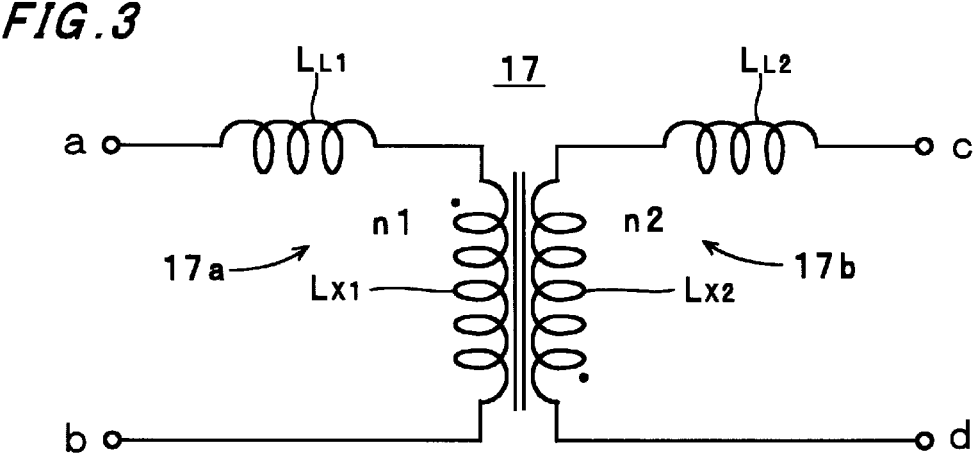
FIG. 3 is a diagram showing an equivalent circuit of the transformer 17 in FIG. 2.

First, the operating principle of the rectifying and smoothing circuit according to the invention will be described with reference to FIG. 1. As shown in the figure, a power supply 1 includes a switching transformer 2 having a primary winding 2a and a secondary winding 2b, and a current doubler rectifying and smoothing circuit 3. The current doubler rectifying and smoothing circuit 3 is comprised of a diode 11 as a rectifying element connected between one end 2b1 of the secondary winding 2b and an output terminal 16a, a diode 12 as a rectifying element connected between the other end 2b2 of the secondary winding 2b and the output terminal 16a, and a capacitor 3 connected between the output terminals 16a and 16b. The current doubler rectifying and smoothing circuit 3 outputs a DC voltage V0 generated by rectifying and smoothing a bipolar voltage induced between opposite ends of the secondary winding 2b, to a load 4. Further, the current doubler rectifying and smoothing circuit 3 includes a transformer 17 which is a leakage transformer and corresponds to a second transformer of the invention. In this embodiment, as shown in FIG. 2, the transformer 17 actually includes a first winding 17a having a number n1 of turns and a second winding 17b having a number n2 of turns. The windings 17a and 17b are wound such that magnetic fluxes generated by respective currents flowing therethrough cancel each other. Referring to FIG. 3, equivalently, the first winding 17a of the transformer 17 is represented by a series circuit of a leakage inductance LL1 calculated on the side of the first winding 17a and an excitation inductance LX1 calculated on the side of the first winding 17a, and the second winding 17b of the transformer 17 is represented by a series circuit of a leakage inductance LL2 calculated on the side of the second winding 17b and an excitation inductance LX2 calculated on the side of the second winding 17b.

Figure 4:
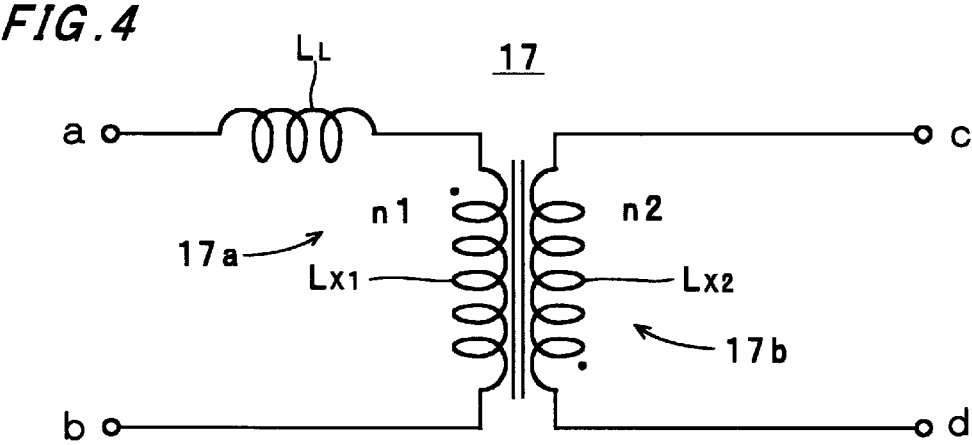
FIG. 4 is a diagram showing an equivalent circuit of the transformer 17 in FIGS. 2 and 3.

The transformer 17 shown in FIG. 3 can be represented as an equivalent circuit shown in FIG. 4. More specifically, in this transformer 17, the leakage inductance LL1 and the leakage inductance LL2 are represented as a leakage inductance LL calculated on the side of the first winding 17a. Hence, let it be assumed hereinafter that the first winding 17a of the transformer 17 is represented by a series circuit of the leakage inductance LL and the excitation inductance LX1, and that the second winding 17b is represented by the excitation inductance LX2. Therefore, in the current doubler rectifying and smoothing circuit 3, as shown in FIG. 1, the transformer 17 is represented as an equivalent circuit in which the series circuit of the leakage inductance LL and the excitation inductance LX1 is connected to opposite ends a and b of the first winding 17a, and the excitation inductance LX2 is connected to opposite ends c and d of the second winding 17b.

Figure 6A:
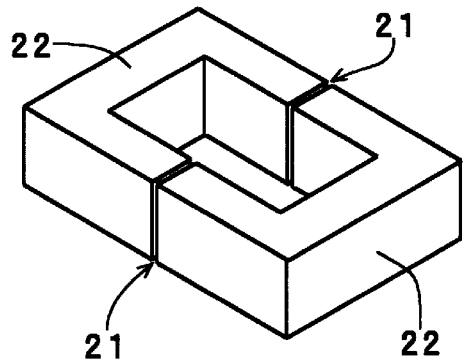
FIG. 6A is a perspective view of an appearance of ferrite cores 22 and 22 for use with the FIG. 2 transformer 17.
Figure 6B:
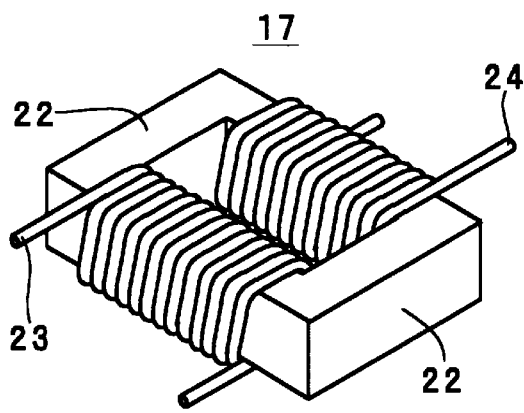
FIG. 6B is a perspective view of an appearance of the transformer 17.

Further, the transformer 17 is constructed by using ferrite cores 22 and 22, for instance, which are formed with gaps 21 and 21 and constitute, as a whole, a generally O-shaped ring core, as shown in FIG. 6A. As shown in FIG. 6B, a conducting wire 23 as the first winding 17a is wound around one of core portions of the ferrite cores 22 and 22, and a conducting wire 24 as the second winding 17b is wound around the other of the core portions of the ferrite cores 22 and 22, in a manner spaced from the conducting wire 23 by a predetermined distance. In this transformer 17, the widths of the gaps 21 and 21 are adjusted, whereby the excitation inductances LX1 and LX2 can be adjusted in magnitude, while the ferrite cores 22 can be changed in shape to adjust the separation distance between the conducting wire 23 and conducting wire 24, whereby the leakage inductance LL (i.e. the leakage inductance LL1 and the leakage inductance LL2) can be adjusted in magnitude. More specifically, to increase the magnitude of the leakage inductance LL, the ferrite cores 22 which provides an increased separation distance between the conducting wires 23 and 24 is employed, whereas to increase the magnitude of the excitation inductance LX, the gaps 21 and 21 are made smaller. Therefore, by adjusting the widths of the gaps 21 and 21 and the separation distance between the conducting wires 23 and 24, respectively, the magnitudes of the leakage inductance LL and the excitation inductances LX1 and LX2 can be defined as desired.

Figure 7A:
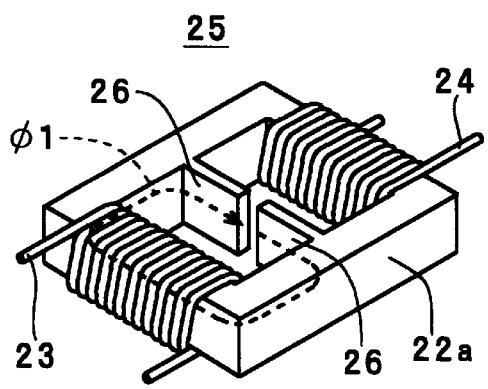
FIG. 7A is a perspective view of an appearance of another transformer 25.
Figure 7B:
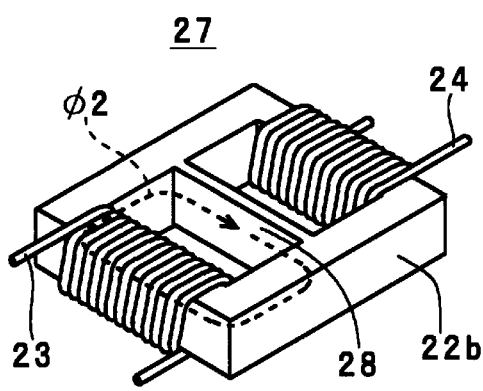
FIG. 7B is a perspective view of an appearance of still another transformer 27.
Figure 8:
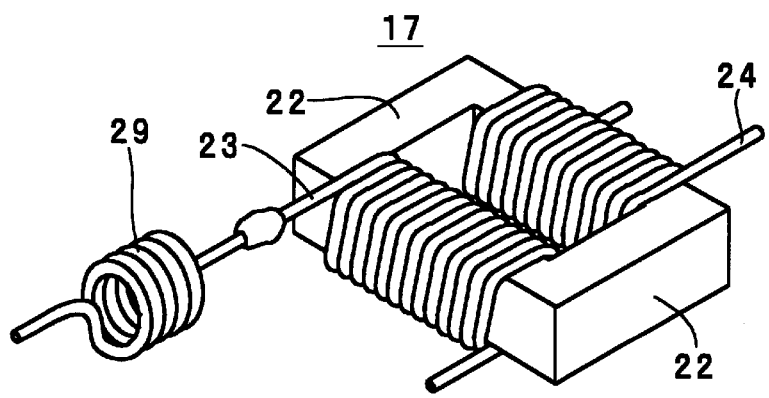
FIG. 8 is a perspective view of an appearance of the transformer 17 with a coil 29 connected in series with a conducting wire 23 thereof.

Further, it is also possible to use a leakage transformer shown in FIG. 7A in place of the transformer 17. This transformer 25 is constructed by using a ferrite core 22a which has intermediate legs 26 and 26 arranged in a manner opposed to each other with opposed ends thereof kept from contact with each other. In this case, the intermediate legs 26 and 26 constitute a magnetic flux bypass passage of the invention, and as shown in the figure, a magnetic flux $\phi 1$ passes through the bypass passage, thereby increasing the leakage inductance LL of the transformer 25. Further, as shown in FIG. 7B, intermediate portions of a body of a ferrite core 22b may be connected to each other by an intermediate leg 28 formed of a magnetic material having a low magnetic permeability. In this case as well, the intermediate leg 28 constitutes the magnetic flux bypass passage of the invention, and as shown in the figure, a magnetic flux $\phi 2$ passes through the bypass passage, thereby increasing the leakage inductance LL of the transformer 27. Furthermore, it is also possible to constitute a whole of the ferrite cores 22 and 22 by using ferrite cores having a low magnetic permeability. In this case as well, the leakage inductance LL can be increased. Further, as shown in FIG. 8, the leakage inductance LL may be increased by connecting a coil 29 of no core type to the conducting wire 23 of the transformer 17. In this case, the leakage inductance LL can be adjusted with ease. Further, the coil 29 may be formed by winding the conducting wire 23.

Next, the operation of the power supply 1 will be described with reference to FIGS. 1 and 5. It should be noted that in the following, description is made by taking the transformer 17 as an example, which is constituted by setting a turns ratio between the number of turns of the first winding 17a and that of turns of the second winding 17b to 1:1. In this case, the excitation inductances LX1 and LX2 become equal to each other, and hence hereinafter they will also be referred to as the excitation inductances LX, respectively, unless they are discriminated from each other.

Figure 5:
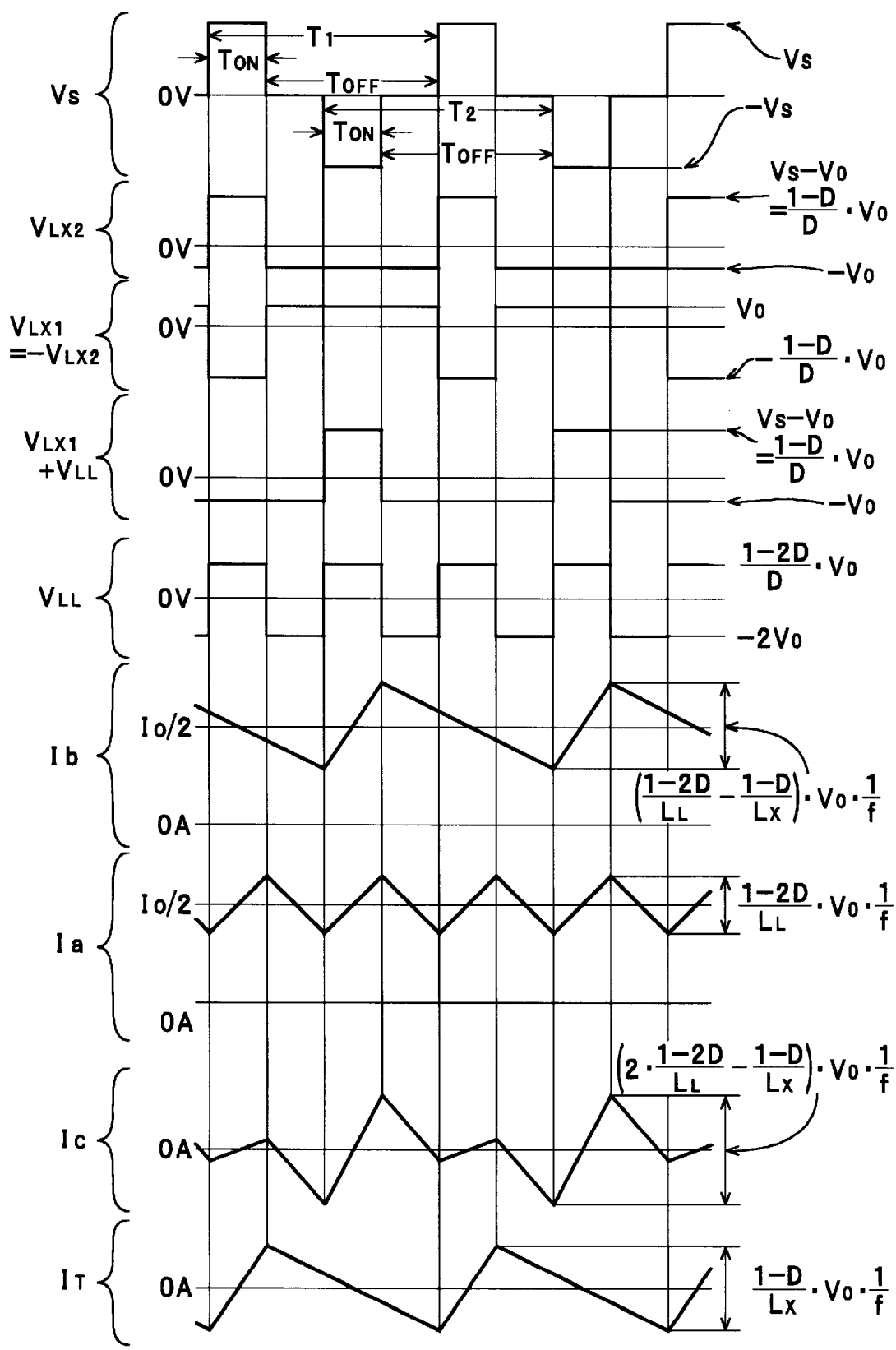
FIG. 5 is a diagram showing a voltage or current waveform of each of component parts of the power supply 1 according to the first embodiment, which includes a diagram showing a voltage waveform of a bipolar voltage VS induced between opposite ends of a secondary winding 2b, a diagram showing a voltage waveform of a voltage VLX2 between opposite ends of an excitation inductance LX2, a diagram showing a voltage waveform of a voltage VLX1 between opposite ends of an excitation inductance LX1, a diagram showing a voltage waveform of a voltage (VLX1+VLL) between opposite ends of a first winding 17a, a voltage waveform of a voltage VLL between opposite ends of a leakage inductance LL, a diagram showing a current waveform of a current Ib flowing through a second winding 17b, a diagram showing a current waveform of a current Ia flowing through the first winding 17a, a diagram showing a current waveform of a ripple current IC flowing through a capacitor 13, and a diagram showing a current waveform of an exciting current IT flowing through the transformer 17.

First, in this power supply, push-pull FET circuits, not shown, connected respectively to one end 2a1 of the primary winding 2a of the transformer 2 and the other end 2a2 thereof are driven at 180 degrees out of phase with respect to each other, whereby as shown in FIG. 5, a bipolar voltage VS having a voltage value±Vs is induced between the opposite ends of the secondary winding 2b of the transformer 2. In this case, in the period T1 during which one of the FET circuits is controlled to an ON state at a duty ratio D of 25%, a high voltage is induced on the side of the one end 2b1 of the secondary winding 2b during the ON time period TON of the FET, and this induced voltage causes a current I1 shown in FIG. 1 to flow through a current path of the one end 2b1 of the secondary winding 2b, the diode 11, the load 4, the excitation inductance LX2 in the form of the second winding 17b, and the other end 2b2 of the secondary winding 2b. In this state, as shown in FIG. 5, a voltage VLX2 having a voltage value (VS−V0=(1−D)/D•V0) and directed as shown in FIG. 1 is generated between opposite ends of the excitation inductance LX2, whereby energy is accumulated in the second winding 17b. At the same time, as shown in the same figure and FIG. 1, a voltage VLX1 which is inverted in sign with respect to the voltage VLX2 is generated between opposite ends of the excitation inductance LX1. Further, during an OFF time period TOFF of the repetition period T1, the energy accumulated in the second winding 17b causes a current I2 to flow in a direction shown in FIG. 1 through a current path of one end c of the second winding 17b, the diode 12, the load 4, and the other end d of the second winding 17b. Consequently, the voltage VLX2 between opposite ends of the excitation inductance LX2 is caused to assume a voltage value (−V0), and at the same time, as shown in FIG. 5, a current Ib varying within a range of a current variation width ((1−2D/LL)−(1−D)/LX)•V0/f) flows through the excitation inductance LX2.

Figure 1:
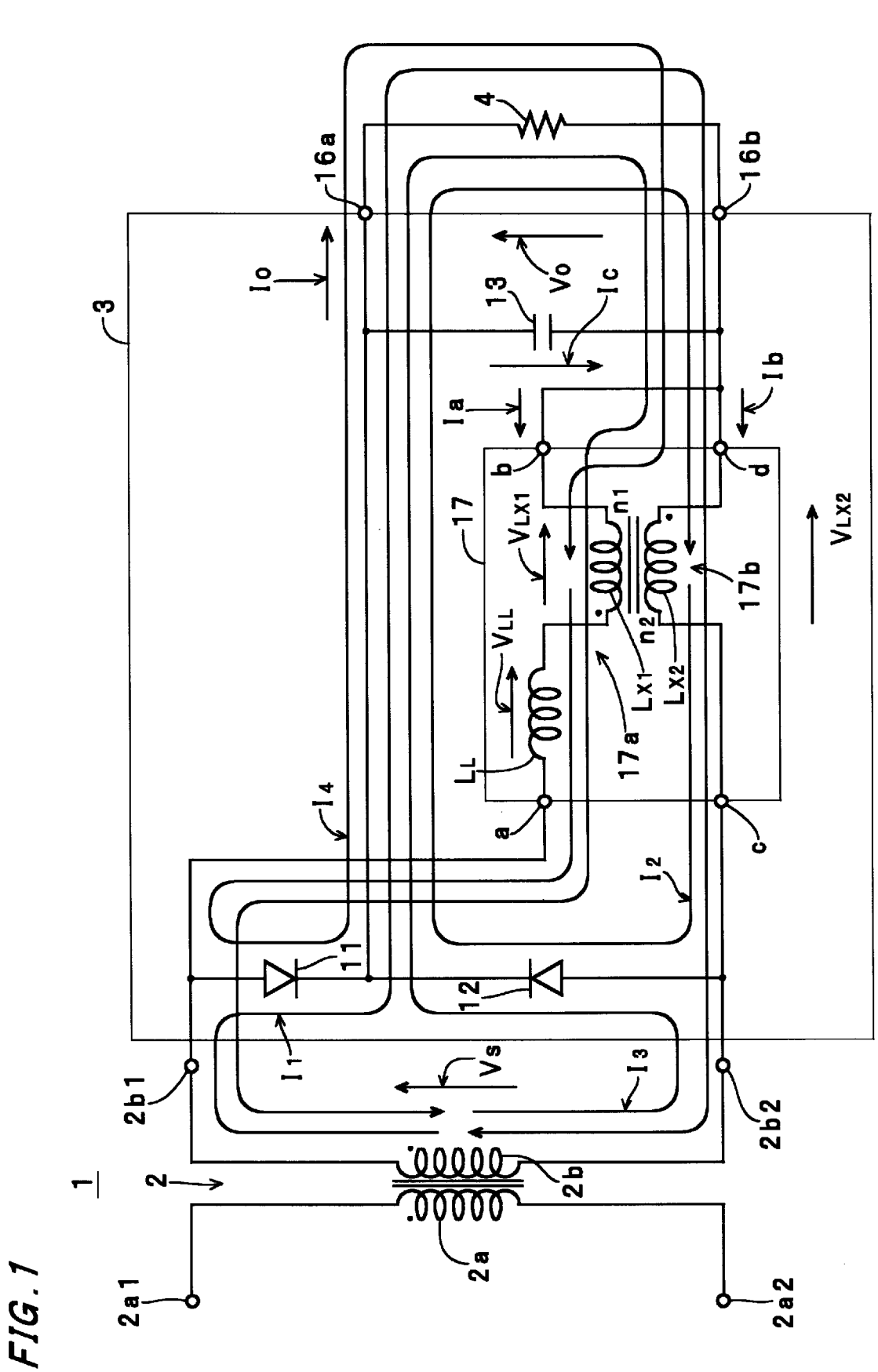
FIG. 1 is a circuit diagram of a power supply 1 according to a first embodiment.

Further, in the period T2 during which the other of the FET circuits controlled to an ON state at a duty ratio D of 25%, a voltage is induced on the side of the other end 2b2 of the secondary winding 2b during an ON time period TON of the FET, and this induced voltage causes a current I3 shown in FIG. 1 to flow through a current path of the other end 2b2 of the secondary winding 2b, the diode 12, the load 4, the first winding 17a as a series circuit of the excitation inductance LX1 and the leakage inductance LL, and the one end 2b1 of the secondary winding 2b. In this state, as shown in FIG. 5, between the opposite ends a and b of the first winding 17a, there is generated a sum voltage (which has a maximum value (VS−V0=(1−D)/D•V0) and a minimum value (−V0)) resulting from addition of the voltage VLX1 (see FIG. 1) between the opposite ends of the excitation inductance LX1 and a voltage VLL (see the same figure) between the opposite ends of the leakage inductance LL, whereby energy is accumulated in the first winding 17a. In this case, the voltage VLL between the opposite ends of the leakage inductance LL is obtained by subtracting the voltage VLX1, shown in FIG. 5, between the opposite ends of the excitation inductance LX1 from the voltage (VLX1+VLL), shown in the figure, between the opposite ends of the first winding 17a. As shown in the same figure, this results in the voltage VLL whose maximum value and minimum value are ((1−2D)•V0/D) and (−2V0) respectively, and the period of which is T1/2 (=T2/2).

Figure 18:
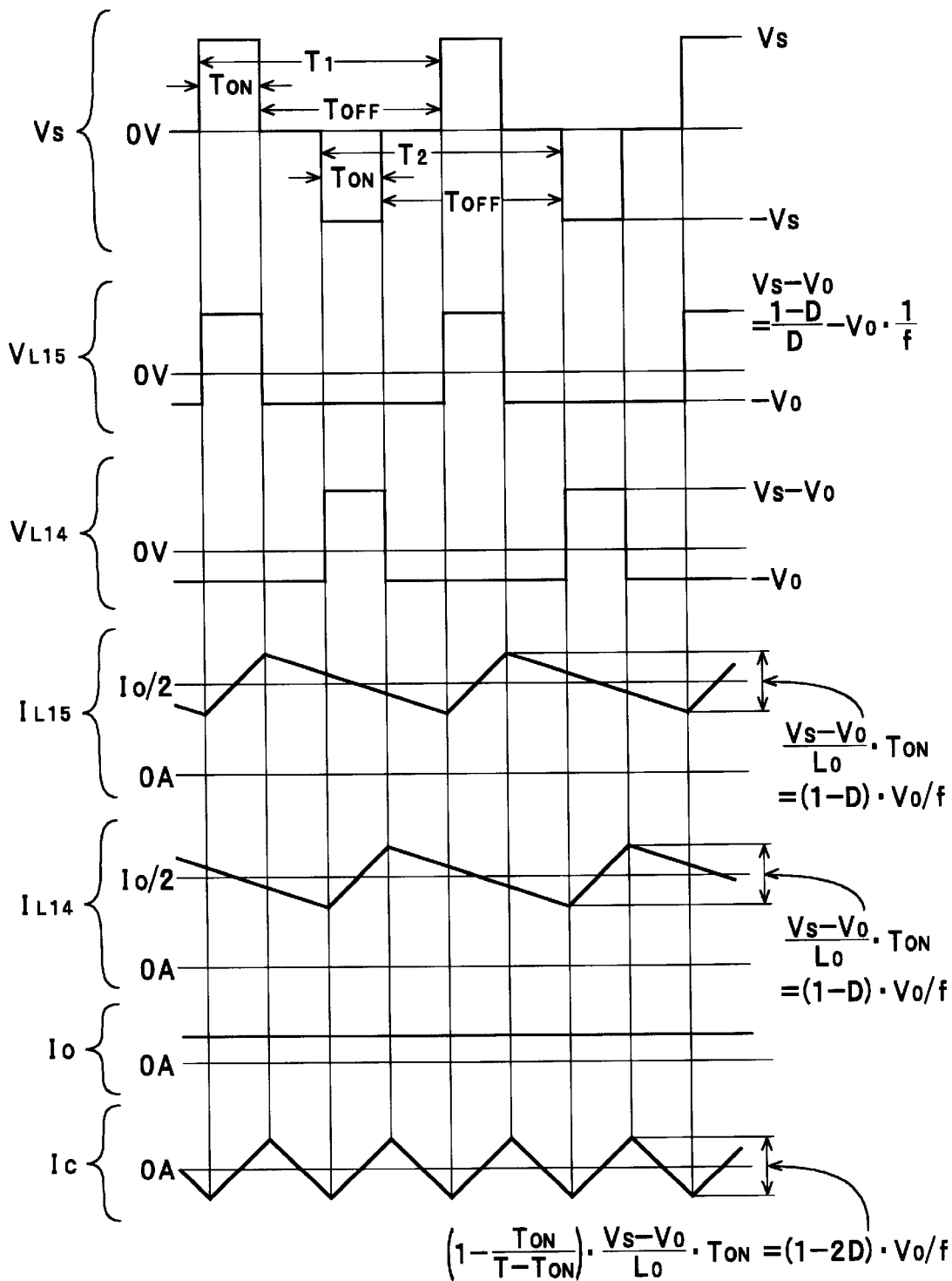
FIG. 18 is a diagram showing a voltage or current waveform of each of component parts of the conventional power supply 81, which includes a diagram showing a voltage waveform of a bipolar voltage VS induced between opposite ends of a secondary winding 2b, a diagram showing a voltage waveform of a voltage VL15 between opposite ends of a choke coil 15, a diagram showing a voltage waveform of a voltage VL14 between opposite ends of a choke coil 14, a diagram showing a current waveform of a current IL15 flowing through the choke coil 15, a diagram showing a current waveform of a current IL14 flowing through the choke coil 14, a diagram showing a current waveform of an output current I0, and a diagram showing a current waveform of a ripple current IC flowing through the capacitor 13.

Further, during an OFF time period TOFF of the period T2, the energy accumulated in the first winding 17a causes a current I4 to flow in a direction shown in FIG. 1 through a current path of one end a of the first winding 17a, the diode 11, the load 4, and the other end b of the first winding 17a. Consequently, as shown in FIG. 5, a current Ia varying within a range of a current variation width $((1-2D/LL) \cdot V0/f)$ flows through the first winding 17a. It should be noted that as shown in FIGS. 1 and 5, a ripple current IC varying within a range of a very small current variation width $(2 \cdot (1-2D/LL) - (1-D)/LX) \cdot V0/f)$ flows through a capacitor 13. In the above process of operation, each of average current values of the currents Ia and Ib becomes equal to one half of an output current I0 (see FIG. 18), since a sum total of the current values of the currents Ia and Ib becomes equal to the output current I0 and at the same time the current values thereof are equal to each other. As a result, magnetic fluxes generated by the current Ia and the current Ib flowing cancel each other. Further, in terms of an instantaneous variation as well, as shown in FIG. 5, an exciting current IT flowing through the transformer 17 varies only slightly within a range of a current variation width $((1-D) \cdot V0/(LX \cdot f))$ resulting from mutual cancellation of the current Ib shown in the figure and the current Ia shown in the figure.

As described above, according to the current doubler rectifying and smoothing circuit 3, the first winding 17a and the second winding 17b of the transformer 17 are used as smoothing coils, whereby magnetic fluxes generated by respective currents (I0/2) flowing through the windings 17a and 17b cancel each other. Hence, a DC component of the exciting current IT flowing through the transformer 17 becomes approximately equal to 0 A. Consequently, magnetic saturation in the transformer 17 caused by a DC bias can be prevented. This makes it possible to constitute smoothing coils including a large excitation inductance LX by using ferrite cores 22 and 22 having small effective volumes, so that the current doubler rectifying and smoothing circuit 3 can be caused to serve as more excellent smoothing filters. Further, since the two choke coils 14 and 15 in the conventional current doubler rectifying and smoothing circuit 82 are replaced by one transformer 17, the current doubler rectifying and smoothing circuit 3, and further the power supply 1 can be made smaller in size.
(Second Embodiment)

Next, the arrangement of a power supply will be described in detail with reference to FIGS. 9 and 10. It should be noted that component parts having the same functions as those of the power supply 1 are designated by identical reference numerals, and redundant description thereof is omitted.

Figure 9:
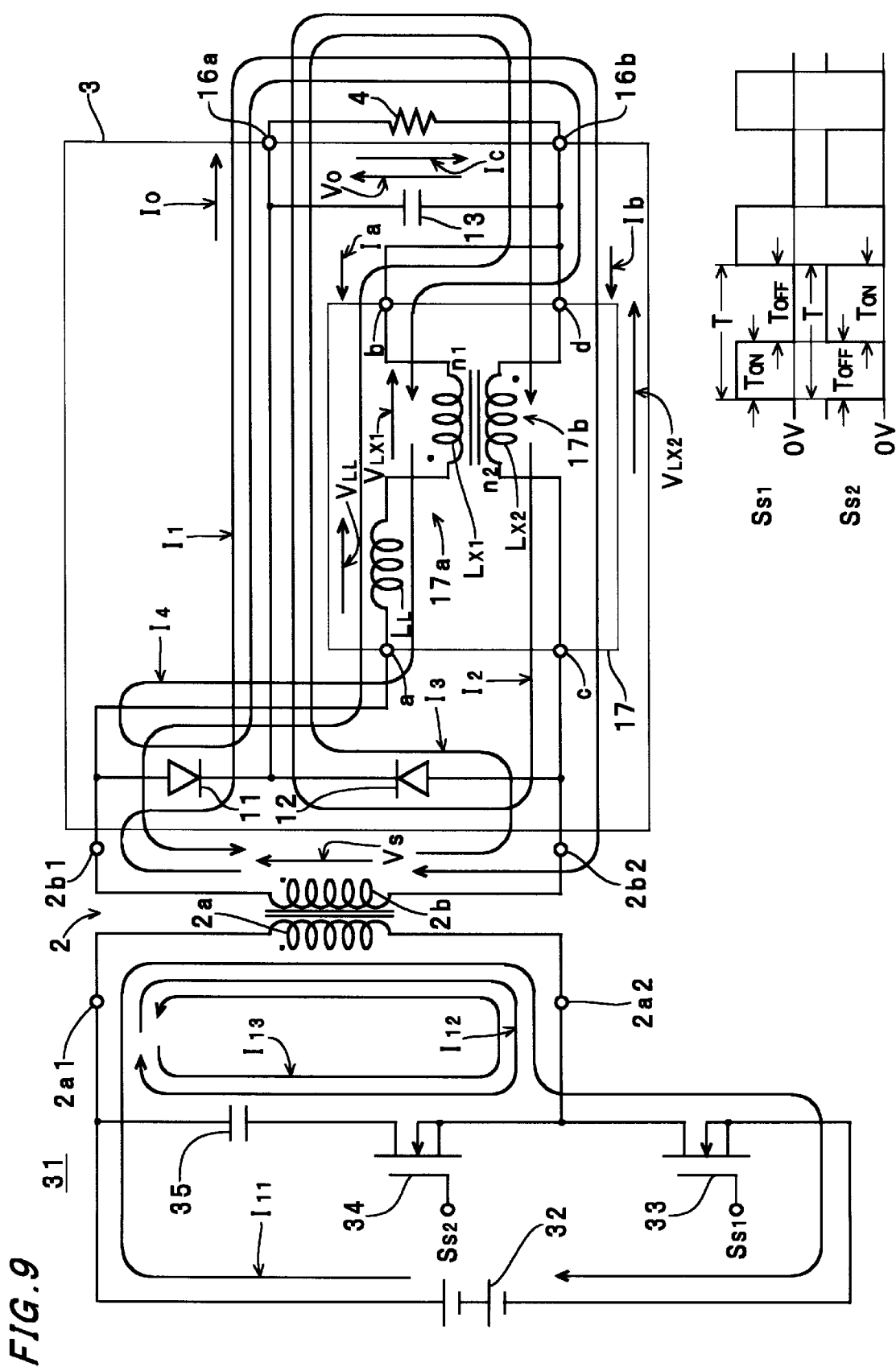
FIG. 9 is a circuit diagram of a power supply 31 according to a second embodiment, which is accompanied by a diagram showing current waveforms of switching signals SS1 and SS2 input to the power supply 31.

A power supply 31 shown in FIG. 9 is an active clamp double-ended forward converter, and has a DC power supply 32, n-channel FETs 33 and 34 which are alternately driven, and a capacitor 35, arranged on the side of a primary winding 2a of a transformer 2.

In the above power supply 31, a switching signal SS1 shown in the figure is input to the gate of the FET 33, and the FET 33 is controlled to an ON state during an ON time period TON of the switching signal SS1. In this state, as shown in the figure, a current I11 flows through a current path of the DC power supply 32, the primary winding 2a, the drain and source of the FET 33, and the DC power supply 32, and the current I11 induces, as shown in FIG. 10, a voltage having a voltage value (+V0/D) and directed as shown in FIG. 9 between the opposite ends of the secondary winding 2b. It should be noted that a bipolar voltage of the invention is formed by this voltage and a voltage induced between the opposite ends of the secondary winding 2b during an ON time period of a switching signal SS2, referred to hereinbelow. Hereinafter, both voltages induced during the period T are generically referred to as a bipolar voltage VS. In this embodiment, the bipolar voltage VS generated between the opposite ends of the secondary winding 2b of the transformer 2 of the power supply 31 is distinguished from the bipolar voltage VS generated in the power supply 1 in that voltage waveforms thereof on a plus side and on a minus side are asymmetric.

Figure 10:
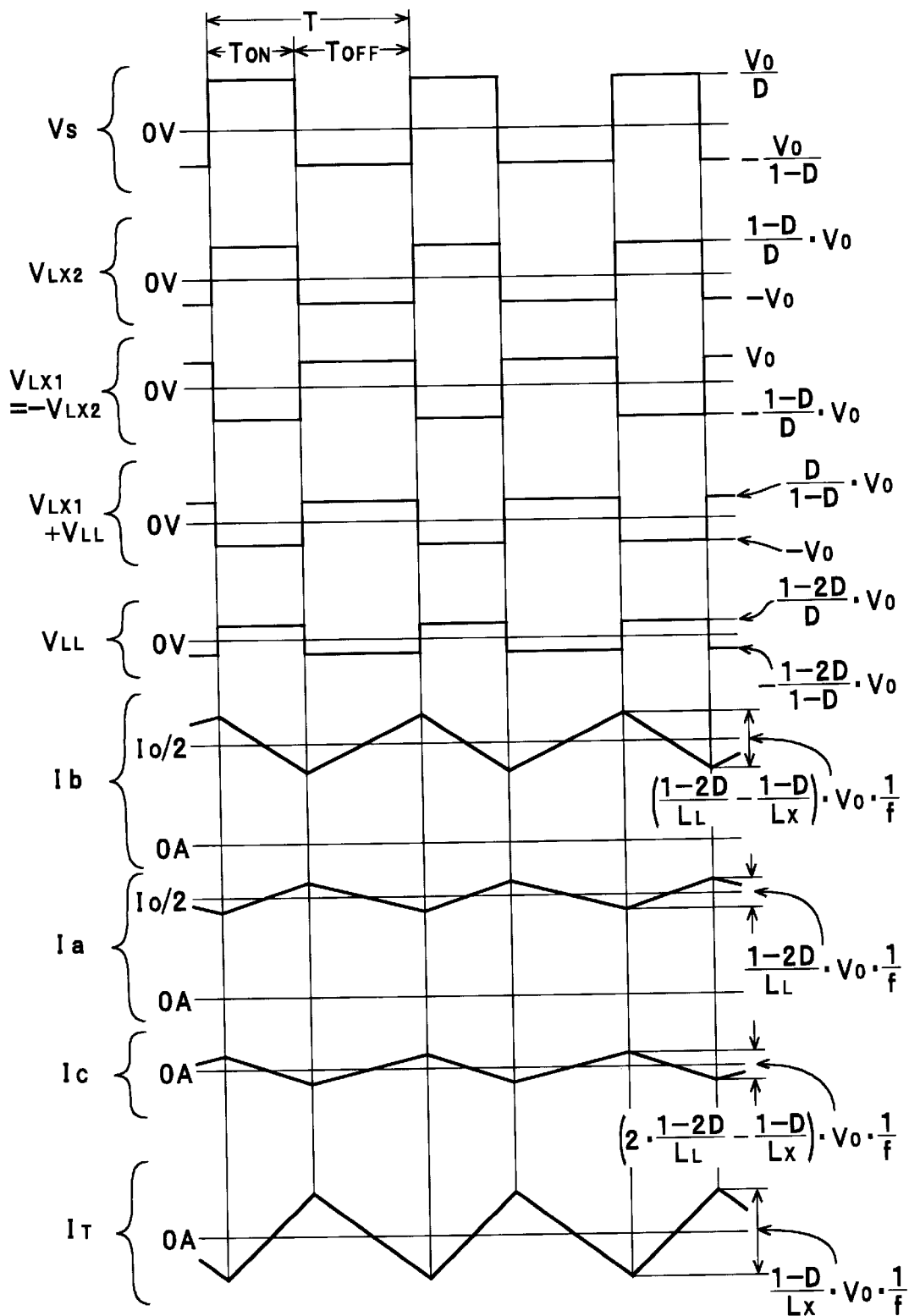
FIG. 10 is a diagram showing a voltage or current waveform of each of component parts of the power supply 31, which includes a diagram showing a voltage waveform of a bipolar voltage VS induced between opposite ends of a secondary winding 2b, a diagram showing a voltage waveform of a voltage VLX2 between opposite ends of an excitation inductance LX2, a diagram showing a voltage waveform of a voltage VLX1 between opposite ends of an excitation inductance LX1, a diagram showing a voltage waveform of a voltage (VLX1+VLL) between opposite ends of a first winding 17a, a voltage waveform of a voltage VLL between opposite ends of a leakage inductance LL, a diagram showing a current waveform of a current Ib flowing through a second winding 17b, a diagram showing a current waveform of a current Ia flowing through the first winding 17a, a diagram showing a current waveform of a ripple current IC flowing through a capacitor 13, and a diagram showing a current waveform of an exciting current IT flowing through the transformer 17.

Next, similarly to the power supply 1, the bipolar voltage VS causes a current I1 shown in FIG. 9 to flow, and as shown in FIG. 10, a voltage VLX2 having a voltage value $(VS-V0=(1-D) \cdot V0/D)$ and directed as shown in FIG. 9 is generated between opposite ends of a second winding 17b, whereby energy is accumulated in the second winding 17b. At the same time, as shown in FIG. 10, a voltage VLX1 having a voltage value $(-(1-D) \cdot V0/D)$ which is reversed in sign with respect to the voltage VLX2 is generated between the opposite ends of an excitation inductance LX1. Further, during an OFF time period TOFF of the switching signal SS1, the energy accumulated in the second winding 17b causes a current I2 to flow in a direction shown in FIG. 9. Consequently, the voltage VLX2 and the voltage VLX1 are caused to have a voltage (−V0) and a voltage (V0), respectively, and at the same time, as shown in FIG. 10, a current Ib varying within a range of a current variation width $((1-2D/LL) - (1-D)/LX) \cdot V0/f)$ flows through the second wiring 17b.

Next, during the OFF time period TOFF of the switching signal SS1, the switching signal SS2 is an ON time period TON, during which, as shown in FIG. 9, an energy accumulated in the primary winding 2a causes a current I12 to flow through a current path of the primary winding 2a, the source and drain of the FET 34, the capacitor 35, and the primary winding 2a, whereby energy is accumulated in the capacitor 35. On the other hand, when the energy accumulated in the primary winding 2a is released, the energy accumulated in the capacitor 35 causes a current I13 to flow through a current path of the capacitor 35, the drain and source of the FET 34, the primary winding 2a, and the capacitor 35.

During the above ON time period TON of the switching signal SS2, the bipolar voltage VS is induced between the opposite ends of the secondary winding 2b, and similarly to the power supply 1, the bipolar voltage VS causes a current I3 shown in FIG. 9 to flow. In this state, as shown in FIG. 10, a sum voltage of the voltages VLX1 and XLV2 directed as shown in FIG. 9 (which has a maximum value $(D \cdot V0/(1-D)=VS-V0)$ and a minimum value (−V0)) is generated, whereby energy is accumulated in the first winding 17a. In this case, a voltage VLL between opposite ends of a leakage inductance LL is equal to a value obtained by subtracting the voltage VLX1, shown in FIG. 10, from the voltage (VLX1+ VLL), shown in the figure. As shown in the figure, this results in the voltage VLL whose maximum value and minimum value are $((1-2D) \cdot V0/D)$ and $(-(1-2D) \cdot V0/(1-D))$, respectively, and the cycle of which is T.

Further, similarly to the power supply 1, during an OFF time period TOFF of the switching signal SS2, the energy accumulated in the first winding 17a causes a current I4 to flow in a direction shown in FIG. 9. Consequently, as shown in FIG. 10, a current Ia varying within a range of a current variation width $((1-2D/LL) \cdot V0/f)$ flows through the first winding 17a. It should be noted that as shown in FIGS. 9 and 10, a ripple current IC varying within a range of a very small current variation width $(2 \cdot (1-2D/LL) - (1-D)/LX) \cdot V0/f)$ flows through a capacitor 13.

In the above process of operation, an average current value of each of the currents Ia and Ib becomes equal to one half of the output current I0 shown in FIG. 9, since a sum total of the current values of the currents Ia and Ib becomes equal to the output current I0 and at the same time the current values thereof are equal to each other. As a result, in the power supply 31 as well, magnetic fluxes generated by the current Ia and the current Ib flowing through the windings 17a and 17b cancel each other. Further, in terms of an instantaneous variation as well, as shown in FIG. 10, an exciting current IT flowing through the transformer 17 varies only slightly within a range of a current variation width $((1-D) \cdot V0/(LX \cdot f))$ resulting from mutual cancellation of the current Ib appearing in the figure and the current Ia appearing in the figure.

As described above, in the power supply 31 as well, magnetic saturation in the transformer 17 can be prevented, similarly to the power supply 1. This makes it possible to constitute smoothing coils including the large excitation inductance LX by using ferrite cores 22 and 22 having small effective volumes, so that it is possible to cause the current doubler rectifying and smoothing circuit 3 to serve as more excellent smoothing filters, and at the same time the current doubler rectifying and smoothing circuit 3, and further the power supply 1 can be made smaller in size.

(Third Embodiment)

Figure 11:
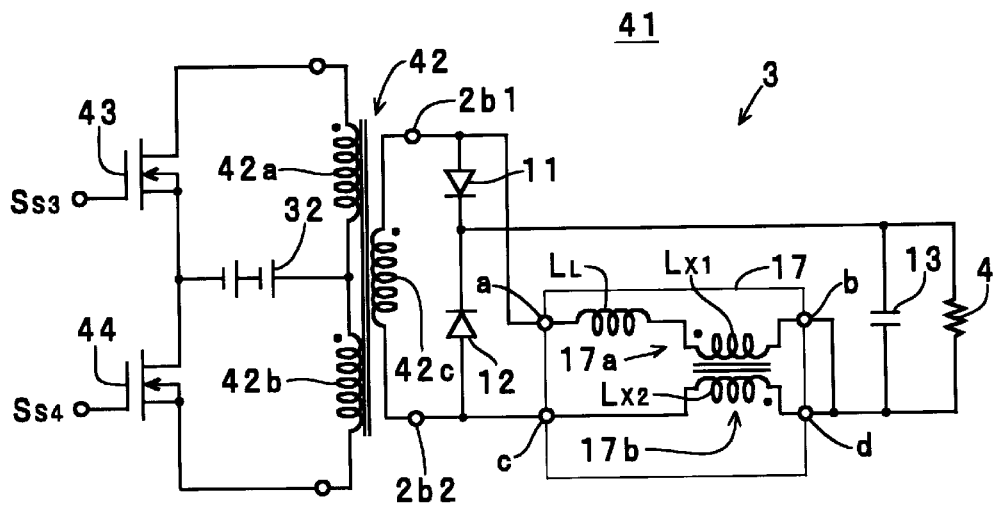
FIG. 11 is a circuit diagram of a power supply 41 according to a third embodiment.
Figure 12:
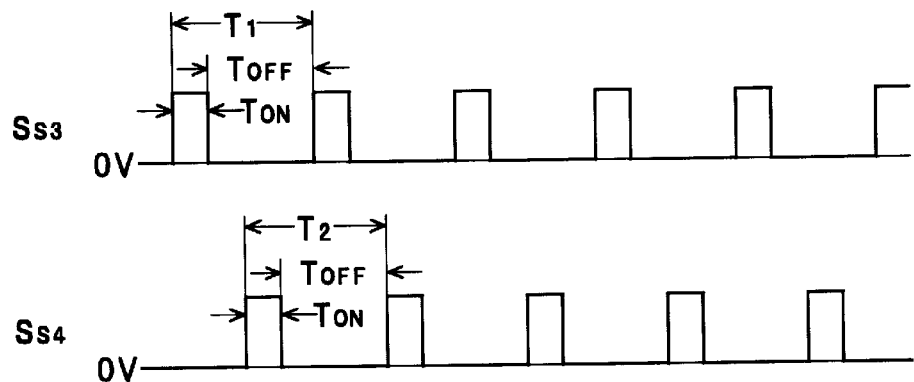

It should be noted that the present invention is not limited to the arrangement of the above power supply 31, but it is possible to change the arrangement of the primary winding-side of the transformer 2 as required. For instance, as in a power supply 41 shown in FIG. 11, the invention can be constructed by using a push-pull converter which is comprised of a transformer 42 having two primary windings 42a and 42b and a secondary winding 42c, a FET 43 connected in parallel with a series circuit of the primary winding 42a and a DC power source 32, and FET 44 connected in parallel with the series circuit of the primary winding 42b and the DC power source 32. In this case, as shown in FIG. 12, switching signals SS3 and SS4 for driving the FETs 43 and 44 at 180 degrees out of phase with respect to each other are input to the gates of the FETs 43 and 44 respectively. Further, this power supply 41, and the current doubler rectifying and smoothing circuit 3 for use with various kinds of power supplies described hereinafter operate in the same manner as the current doubler rectifying and smoothing circuit 3 of the power supply 1. Hence, the same component parts as those of the power supply 1 are designated by identical reference numerals, and description of operations as power supplies is omitted.

(Fourth Embodiment)

Figure 13:
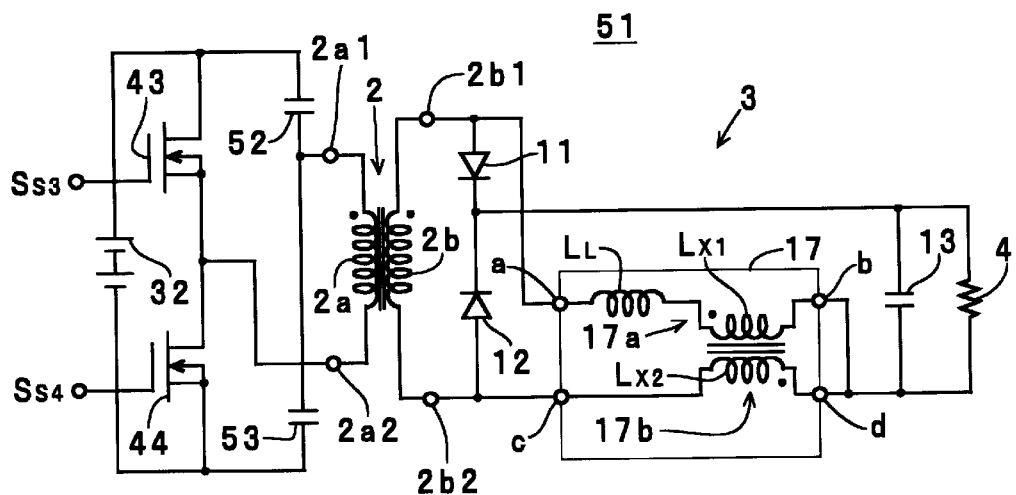
FIG. 13 is a circuit diagram of a power supply 51 according to a fourth embodiment.

Further, as in a power supply 51 shown in FIG. 13, the invention can also be constructed by using a so-called half-bridge converter in which on the side of a primary winding 2a, a series circuit of two FETs 43 and 44 and a series circuit of two capacitors 52 and 53 are connected in parallel with a DC power source 32, while opposite ends 2a2 and 2a1 of the primary winding 2a are connected to a junction of the FETs 43 and 44 and a junction of the capacitors 52 and 53, respectively. In this case as well, the switching signals SS3 and SS4 appearing in FIG. 12 are input to the gates of the FETs 43 and 44 respectively.

(Fifth Embodiment)

Figure 14:
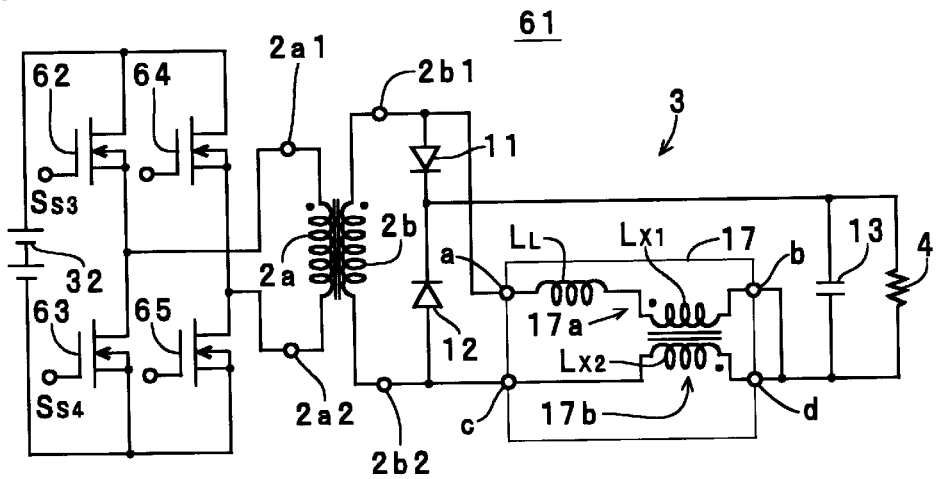
FIG. 14 is a circuit diagram of a power supply 61 according to a fifth embodiment.

Further, as in a power supply 61 shown in FIG. 14, the invention can also be constructed by using a so-called full-bridge converter, in which on the side of a primary winding 2a, a series circuit of two FETs 62 and 63 and a series circuits of two FETs 64 and 65 are connected in parallel with a DC power source 32, while opposite ends 2a1 and 2a2 of the primary winding 2a are connected to a junction of the FETs 62 and 63 and a junction of the FETs 64 and 65, respectively. In this case, the switching signal SS3 appearing in FIG. 12 is input to the gates of the FETs 62 and 65, and the switching signal SS4 appearing in FIG. 12 is input to the gates of the FETs 63 and 64.

(Sixth Embodiment)

Figure 15:
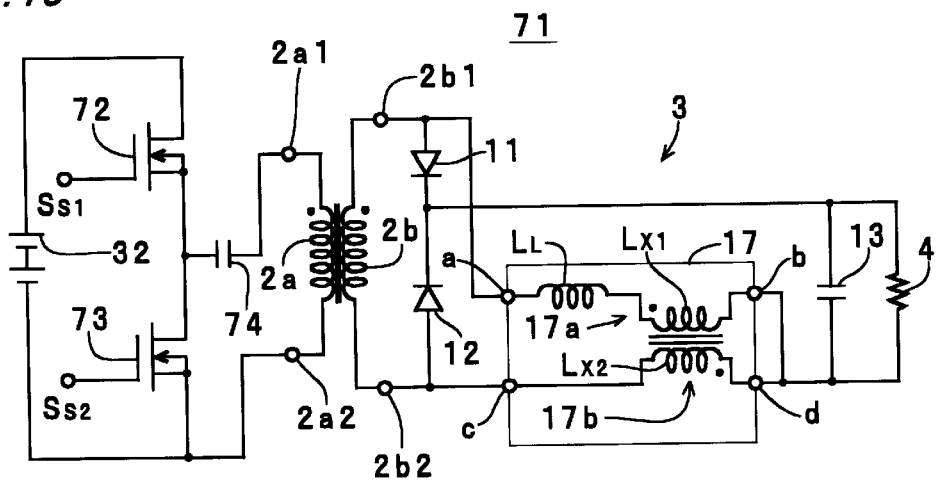
FIG. 15 is a circuit diagram of a power supply 71 according to a sixth embodiment.
Figure 16:
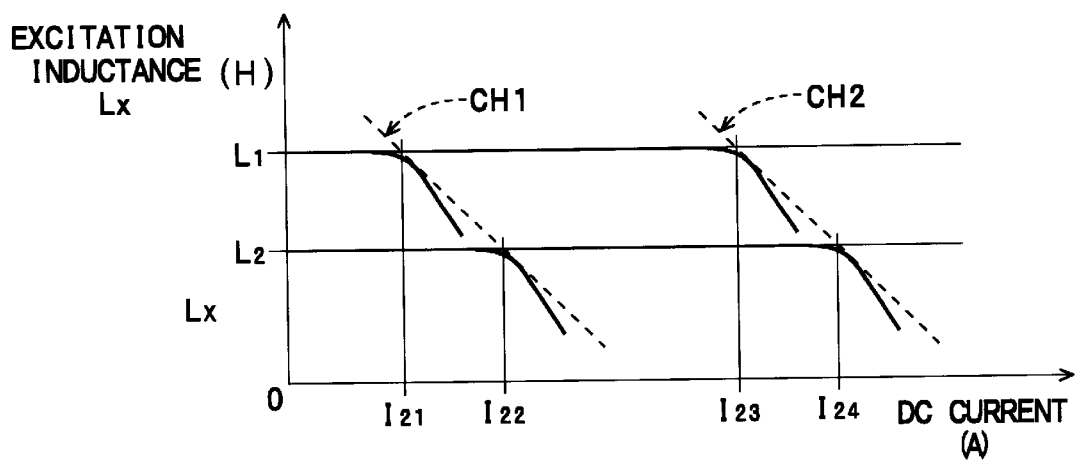
FIG. 16 is a characteristics diagram showing the relationship between a DC current and an excitation inductance LX.
Figure 17:
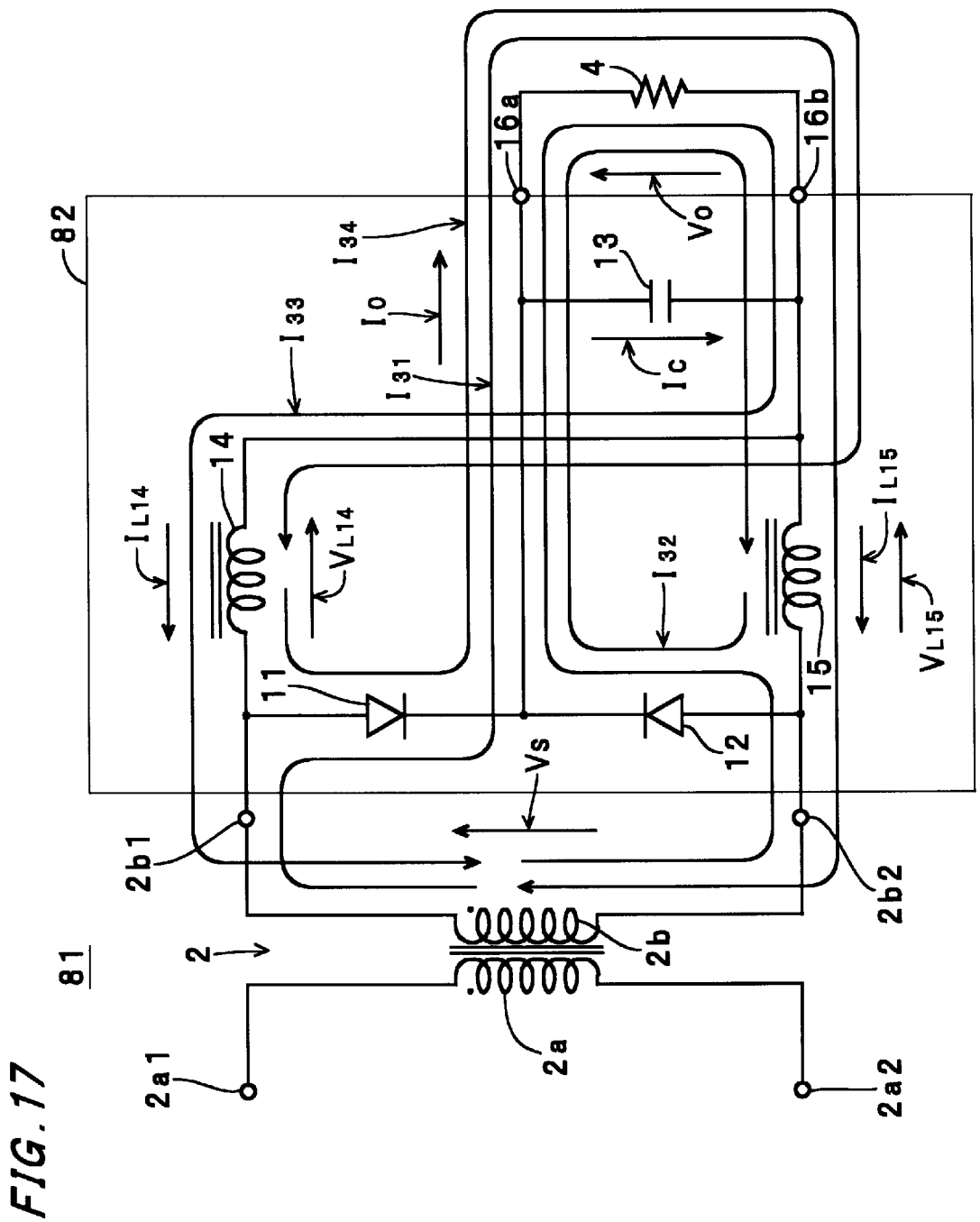
FIG. 17 is a circuit diagram of a conventional power supply 81.

Further, as in a power supply 71 shown in FIG. 15, the invention can also be constructed by using a so-called asymmetric half-bridge converter in which on the side of a primary winding 2a, a series circuit of two FETs 72 and 73 is connected in parallel with a DC power source 32, while a series circuit of a capacitor 74 and the primary winding 2a is connected in parallel between the drain and the source of the FET 73. In this case, the switching signals SS1 and SS2 appearing in FIG. 9 are input to the gates of the FETs 72 and 73, respectively.

Further, although in each of the above power supplies, the examples in which the FETs are used as the switching elements arranged on the side of the primary winding of the switching transformer were described, this is not limitative, but it is possible to employ various types of switching elements, such as transistors and the like. Further, although in the embodiments of the invention, description was made based on the examples in which the transformer 17 is constituted by setting a turns ratio between the number of turns of the first winding 17a and that of turns of the second winding 17b to 1:1, this is not limitative, but the transformer used can be constituted at an arbitrary turns ratio. In this case, the amount of the ripple current IC flowing through the capacitor 13 can be determined as desired by selecting a turns ratio as required.

INDUSTRIAL APPLICABILITY

As described above, according to the rectifying and smoothing circuit of the invention, the first winding and the second winding of the second transformer, which are wound in a manner permitting magnetic fluxes generated by currents flowing therethrough to cancel each other, are used as the first and second smoothing inductors, whereby an exciting current flowing through the second transformer can be sharply decreased, and at the same time magnetic saturation in the second transformer can be prevented. This makes it possible to construct a smoothing inductor having a larger excitation inductance by using cores having small effective volumes. Therefore, the rectifying and smoothing circuit can serve as more excellent smoothing filters, and at the same time the manufacturing costs and size thereof can be reduced through reduction of the number of component parts thereof. As a result, a power supply reduced in manufacturing costs and size can be realized by using the rectifying and smoothing circuit.

Further, according to the double-ended converter of the invention, it is possible to realize a power supply having more excellent smoothing filters and reduced in manufacturing costs and size by reduction of the number of component parts of the rectifying and smoothing circuit.

What is claimed is:

1. A rectifying and smoothing circuit comprising:
   a first switching transformer having an output winding having one end and another end;
   a low potential-side output portion;
   a high potential-side output portion;
   a first inductor connected between said one end of said output winding and said low potential-side output portion;

a second inductor connected between said another end of said output winding and said low potential-side output portion;

a first rectifying element connected between said one end of said output winding and said high potential-side output portion; and a second rectifying element connected between said another end of said output winding and said high potential-side output portion, the rectifying and smoothing circuit generating a DC voltage by rectifying and smoothing a bipolar voltage induced across said output winding, wherein said first inductor and said second inductor are constructed by a first winding and a second winding of a second transformer, respectively, said first winding and said second winding being wound in a manner such that magnetic fluxes generated by respective currents flowing therethrough cancel each other.

2. The rectifying and smoothing circuit according to claim 1, wherein said first inductor and said second inductor are each constructed of a series circuit of an equivalent leakage inductance of said second transformer and an equivalent excitation inductance of said second transformer.

3. The rectifying and smoothing circuit according to claim 2, wherein said first winding and said second winding of said second transformer are wound so as to be spaced from each other by a predetermined distance.

4. The rectifying and smoothing circuit according to claim 2, wherein said second transformer includes a magnetic flux bypass passage.

5. The rectifying and smoothing circuit according to claim 2, wherein said second transformer uses magnetic cores having a low magnetic permeability.

6. The rectifying and smoothing circuit according to claim 2, wherein said first winding and said second winding of said second transformer are wound around magnetic cores formed with gaps.

7. The rectifying and smoothing circuit according to claim 2, including at least one third inductor each connected in series with a corresponding one of said first winding and said second winding.

8. The rectifying and smoothing circuit according to claim 1, wherein said first winding and said second winding of said second transformer are wound so as to be spaced from each other by a predetermined distance.

9. The rectifying and smoothing circuit according to claim 1, wherein said second transformer includes a magnetic flux bypass passage.

10. The rectifying and smoothing circuit according to claim 1, wherein said second transformer uses magnetic cores having a low magnetic permeability.

11. The rectifying and smoothing circuit according to claim 1, wherein said first winding and said second winding of said second transformer are wound around magnetic cores formed with gaps.

12. The rectifying and smoothing circuit according to claim 1, including at least one third inductor each connected in series with a corresponding one of said first winding and said second winding.

13. A double-ended converter comprising a rectifying and smoothing circuit, said rectifying and smoothing circuit including:

a first switching transformer having an output winding having one end and another end;

a low potential-side output portion;

a high potential-side output portion;

a first inductor connected between said one end of said output winding and said low potential-side output portion;

a second inductor connected between said another end of said output winding and said low potential-side output portion;

a first rectifying element connected between said one end of said output winding and said high potential-side output portion; and a second rectifying element connected between said another end of said output winding and said high potential-side output portion, said rectifying and smoothing circuit generating a DC voltage by rectifying and smoothing a bipolar voltage induced across said output winding, wherein said first inductor and said second inductor are constructed by a first winding and a second winding of a second transformer, respectively, said first winding and said second winding being wound in a manner such that magnetic fluxes generated by respective currents flowing therethrough cancel each other.

14. The double-ended converter according to claim 13, wherein said first inductor and said second inductor are each constructed by a series circuit of an equivalent leakage inductance of said second transformer and an equivalent excitation inductance thereof.

* * * * *